(12) United States Patent
Wangler

(10) Patent No.: US 6,997,796 B1
(45) Date of Patent: Feb. 14, 2006

(54) MEAT MALLET WITH INTERCHANGEABLE TENDERIZING SURFACES

(75) Inventor: Eric J. Wangler, 4447 Freeman, Orchard Park, NY (US) 14127

(73) Assignees: Eric J. Wangler, Mendon, NY (US); Mary P. Crowley-Wangler, Mendon, NY (US)

( * ) Notice: Subject to any disclaimer, the term of this patent is extended or adjusted under 35 U.S.C. 154(b) by 0 days.

(21) Appl. No.: 10/885,409

(22) Filed: Jul. 6, 2004

(51) Int. Cl.
*A22B 5/10* (2006.01)

(52) U.S. Cl. ..................................... 452/102
(58) Field of Classification Search ................ 452/141, 452/146, 147; 81/19, 20, 22, 25, 26; 30/308, 30/308.1, 308.2, 308.3
See application file for complete search history.

(56) References Cited

U.S. PATENT DOCUMENTS

| | | | | | |
|---|---|---|---|---|---|
| 276,247 | A | * | 4/1883 | Howe | 81/19 |
| 495,607 | A | * | 4/1893 | Barney | 81/19 |
| 988,402 | A | * | 4/1911 | Strandberg | 125/41 |
| 1,288,892 | A | * | 12/1918 | Holbrook | 81/19 |
| 1,419,615 | A | * | 6/1922 | Cohen | 81/19 |
| 2,335,150 | A | * | 11/1943 | Johnson | 29/81.17 |
| 2,501,757 | A | * | 3/1950 | Cagle | 7/145 |
| 4,199,841 | A | | 4/1980 | Jaccard | |
| 4,257,144 | A | | 3/1981 | Takegoshi et al. | |
| 4,908,909 | A | | 3/1990 | Akrenius | |
| 5,255,575 | A | | 10/1993 | Williams | |
| 5,393,261 | A | | 2/1995 | Winton | |
| 5,593,346 | A | * | 1/1997 | Washington | 452/146 |
| 6,159,090 | A | | 12/2000 | Thompson | |
| 6,223,651 | B1 | | 5/2001 | Campbell | |

* cited by examiner

Primary Examiner—Thomas Price
(74) Attorney, Agent, or Firm—John C. McMahon

(57) ABSTRACT

A meat mallet for tenderizing and flattening meat with a handle, a neck and a head with interchangeable face plates. The face plates have a meat-engaging surface of varying patterns that can be flat, have outwardly projecting points of different sizes and shapes to accommodate meats having different connective tissues or other suitable tenderizing structure. The head has a partially hollow cavity that opens at a front end and stores the face plates in a nested configuration with the top-most plate being an in-use plate. The face plates have a perimeter support shoulder that facilitates the nesting configuration providing a perimeter support system while protecting the meat engaging surfaces of the face plates. A retainer ring has an inner threaded surface that threadedly engages an outer threaded surface of the front end of the head and allows the meat-engaging surface of the in-use plate to partially extend past the retainer ring to engage the subject meat.

16 Claims, 2 Drawing Sheets

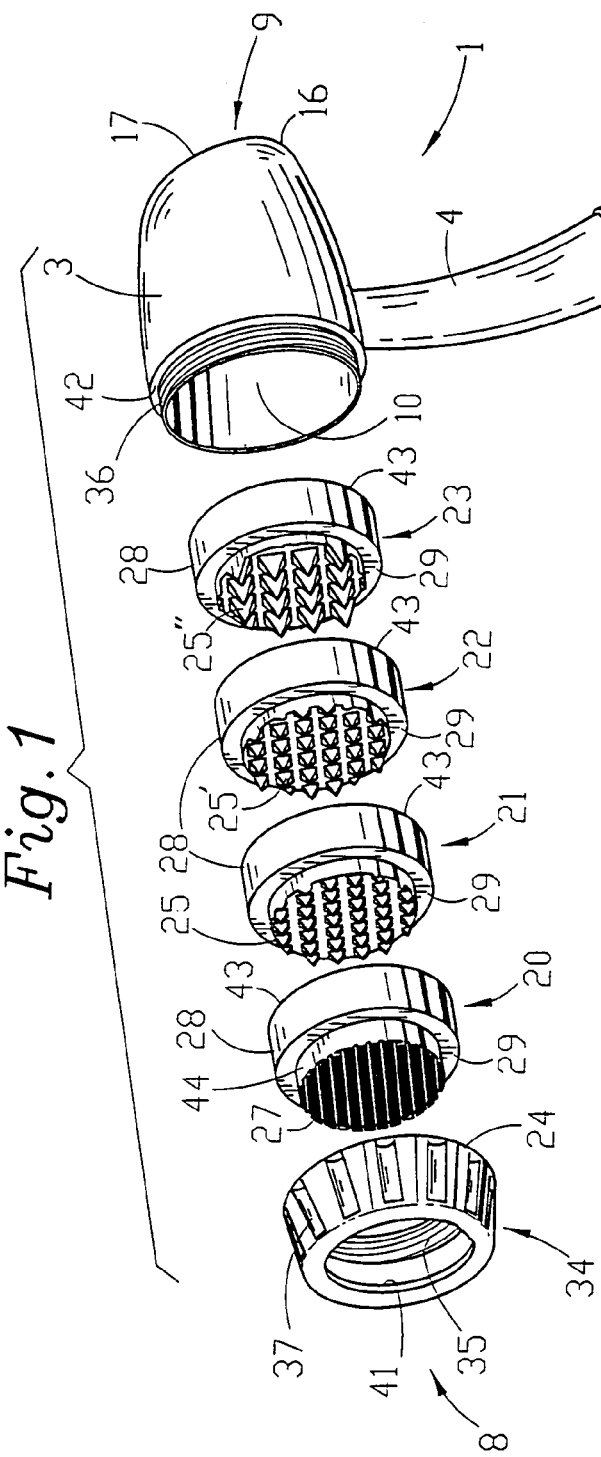
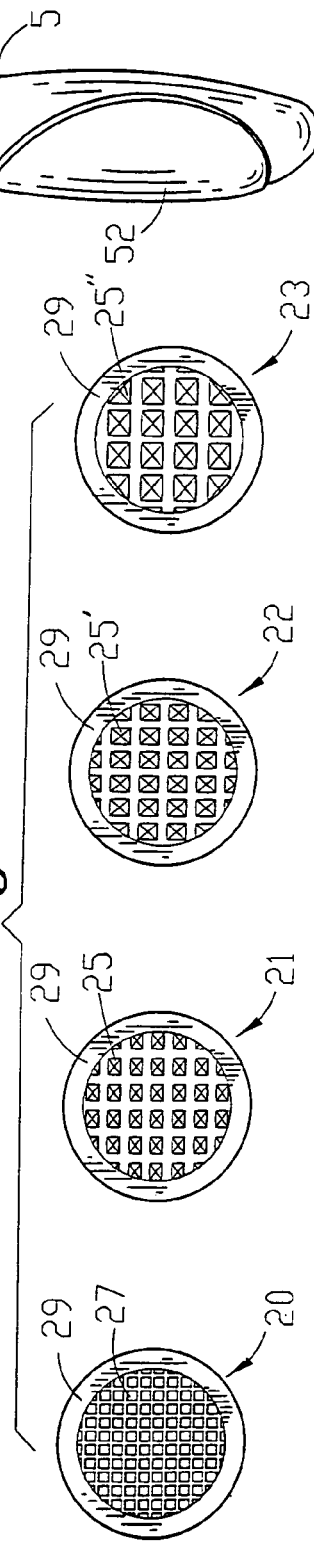

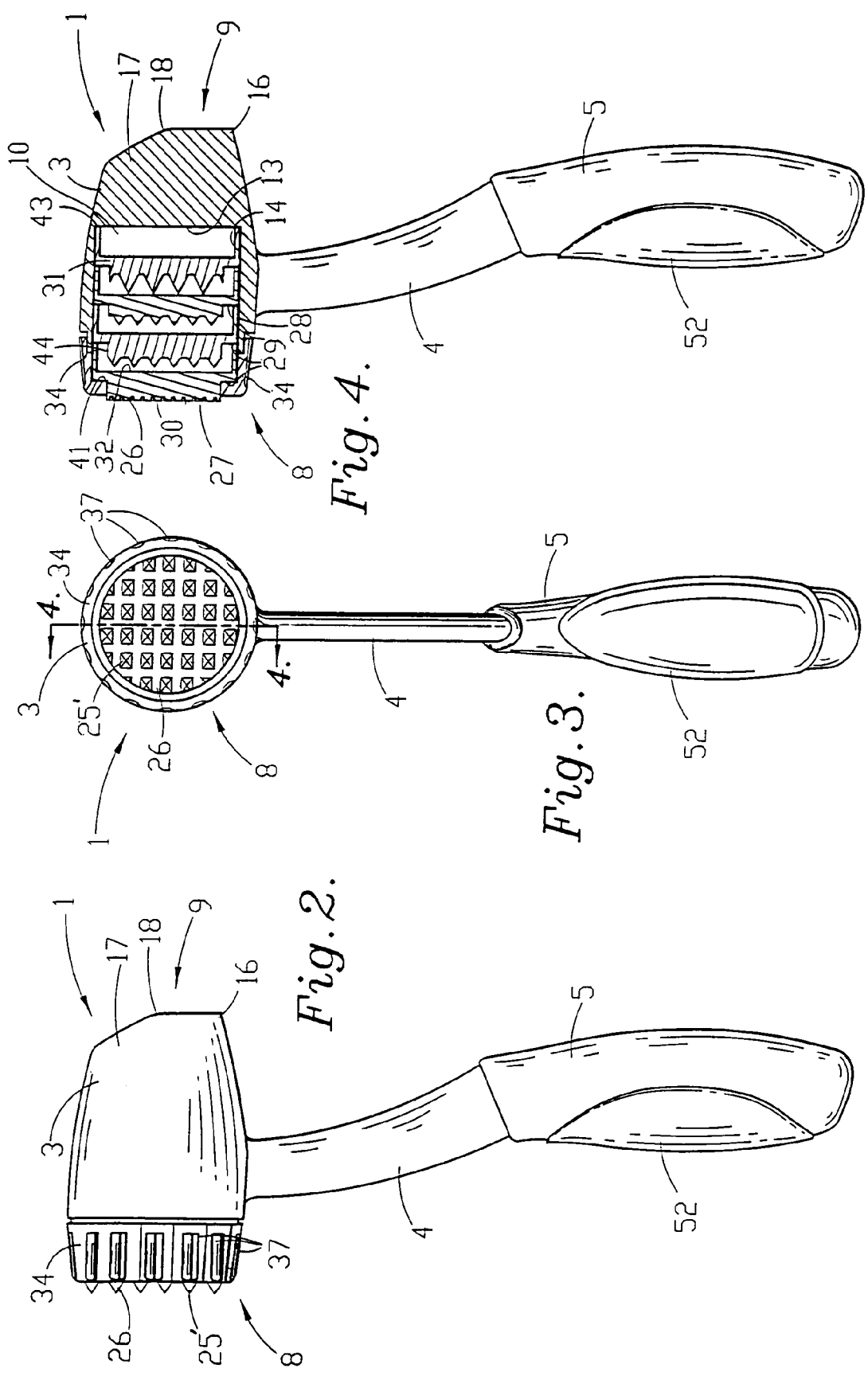

MEAT MALLET WITH INTERCHANGEABLE TENDERIZING SURFACES

BACKGROUND OF THE INVENTION

The present application is directed to a meat mallet for use in tenderizing and flattening meat during preliminary processing prior to cooking and consumption, and in particular to such a meat mallet having a head having a number of interchangeable and nestable face plates with a plurality of mini-tenderizing or flattening surfaces of varying sizes and shapes depending on type and quality of the meat.

Meat hammer-type mallets have been used for many years to tenderize and flatten various raw meats such as pork, beef and chicken prior to cooking and consumption. Meat mallets are especially ideal for meats having an excessive amount of connective tissue or that are otherwise not of ideal or desired tenderness. Meat mallets have evolved over the years with early meat mallets configured similar to traditional hammers with a handle that is attached to a head having a fixed face or two fixed faces on either end. One such mallet even had three fixed faces each with a different surface. While such fixed faced meat mallets are capable of tenderizing or flattening a particular type of meat, such are typically not suited for a wide variety of jobs and may be quite inefficient for certain purposes.

It has been found that equipping the face of the head with small projections, especially pointed projections, to pierce the surface of the meat, certain types of meat can be tenderized in less time. Therefore, meat mallets have used outwardly projecting points to assist in tenderizing the meat. However, a single face with one configuration of sharp projections, or one with simply a flat face, is incompatible with the many types and qualities of meats. Consequently, the tenderization and flattening process is more effective when a good selection of different heads with projections of various sizes and shapes can be employed depending on the type of meat.

In order to provide numerous heads, the prior art requires numerous mallets with many fixed heads that take up substantial counter and storage space. Prior art devices have provided a series of meat mallets whereby the user can choose the appropriate mallet from a number of mallets. However, users desire simplicity and efficiency and a single efficient mallet rather than a number of mallets. As noted above, other prior art has equipped meat mallets with a plurality of faces, such as a front and rear face, each with projections of different shapes and sizes for different types of meat. However, this approach has also been deficient as the heads are fixed and more than two or three types of heads are required to provide for the range required by many cooks.

SUMMARY OF THE INVENTION

The present invention resolves the problems previously outlined and provides a meat mallet with interchangeable and differently configured face plates so that a single mallet, having a handle and head, can be used with various meats having different connective tissues or mallet requirements. The face plates have a perimeter rim with a shoulder surface so that they can be mounted on top of each other in a nested or stacked configuration. The mallet head includes a bore for receiving the nested plates with one plate extending exteriorly and held in place by a screw-on retention ring.

Each plate includes a rearwardly projecting peripheral ring that is sized and shaped to rest or mount on the shoulder surface of a next lower and adjacent plate. The shoulder surface provides a durable support surface for the next higher plate for impacting meat so that the face plates below the in-use or top-most plate are spaced from one another and not damaged by use. The stacking configuration provides a compact storage configuration and enables the plates to be stored within the head thus providing an adaptable meat mallet that is compact in design and easy to use, but which includes a plurality of different face plates, each of which can be selectively used for the type of meat being prepared.

OBJECTS AND ADVANTAGES OF THE INVENTION

The principal objects and advantages of the present invention are: to provide a meat mallet, having a handle and a head with selectively interchangeable face plates, which provides a single meat mallet that can be used for different purposes and for tenderizing and/or flattening different meats; to provide such a meat mallet having different face plates with outwardly extending projections of various shapes and sizes and/or flattening surfaces to allow different face plates to accommodate different meats; to provide such a meat mallet having face plates with an outer perimeter or rim and a rearward projecting ring to rest on the rim of the next plate so as to enable nesting of the face plates while providing support and spacing to each respective outermost face plate so that it will not cause damage to the next plate not in use; to provide such a meat mallet having a bore or cavity producing or hollow head for receiving and storing the face plates directly behind a plate being used; to provide such a meat mallet with a handle that is ergonomic and manufactured of a material that is conducive to use; to provide such a meat mallet which can be manufactured at a low cost, which can then be marketed at a low cost, thereby making such a meat mallet economically available to the buying public; to provide such a meat mallet which is constructed of a material that is durable and is particularly well-suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective and exploded view of a meat mallet in accordance with the present invention having a handle, a neck and a head with a set of interchangeable face plates that are stored within the head.

FIG. 2 is side elevational view of the meat mallet.

FIG. 3 is front elevational view of the meat mallet.

FIG. 4 is a cross sectional view of the meat mallet, taken along line 4—4 of FIG. 2 illustrating the set of interchangeable face plates in a stored configuration within the head.

FIG. 5 is a front elevational view of the set of face plates illustrating various patterns for different.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a meat mallet in accordance with the present invention for tenderizing meat, such as beef, poultry and pork. The meat mallet 1 has a head 3 that is joined to an upper end of an elongate tubular body or neck 4 with the other end attached to a handle 5. The head 3 is partially and generally cylindrical with an open face 8, a rear surface 9 and a forward opening cavity 10 that is cylindrical. The cavity 10 has a face plate receiving bottom surface 13 and face plate receiving and surrounding wall surface 14. The cavity 10 begins at the face surface 8 of the head 3 and extends partially through the head 3. The rear of the head 3 is a solid ballast region 16. The purpose of the region 16 is to provide weight for driving the mallet 1 into meat being tenderized thereby. The ballast region 16 has a sloped surface 17 that is designed to intersect a center point 18, as shown in FIG. 2.

The face 8 can be selectively equipped with a set of various different face plates, which are adapted to be used according to the subject meat, including a flattening face plate 20, a small pointed face plate 21, a medium pointed face plate 22 and a large pointed face plate 23. Each face plate 20–23 has a meat engaging surface 26 that has the various patterns thereon depending on the subject meat. The small, medium and large face plates 21–23 have outwardly extending points 25, 25' and 25" respectively. The preferred points 25, 25' and 25" are pyramid projections of various sizes and shapes located on each meat engaging surface 26 of the face plates 21–23 that are for tenderizing a particular subject meat and are used according to the condition and strength of the connective tissue of said meat. The flattening face plate 20 has grooves forming a cross-hatched pattern 27. The purpose of the cross-hatched pattern 27 is to provide a vacuum break between the meat being struck and the face plate 20. If the vacuum break is not present, then the striking action of the meat mallet 1, while using the plate 20, is capable of forming a vacuum seal between the plate 20 and the subject meat, so that the meat is picked up by the hammer. This undesired effect is especially likely as the meat releases juices.

On the opposite side of each of the face plates 20–23 is an indicia (not shown) marked thereupon, the indicia being formed as a plurality of letters or the like to permit a user to determine and select an in-use or top-most face plate 30 from the plurality of face plates 20–23 in accordance with the subject meat. In FIGS. 2 and 3, the top plate 30 is the medium faceplate 22. In FIGS. 1 and 4, the top plate 30 is the flattening faceplate 20.

The face plates 20–23 are sized and shaped to be snugly stored in a stacked or nested configuration, as depicted in FIG. 4, within the cavity 10, which is sized and shaped to receive slidingly receives the face plates 20–23, as the plates 20–23 are inserted from the face 8 end of the cavity 10. The nesting configuration is achieved via the design of the face plates 20–23, which includes the meat-engaging front surface 26 that is spaced by an elevated region or riser 44 from a circumferential and rearwardly projecting ring 29 with a respective side surface 28 and a rear abutment surface 43. The rear surface 43 is spaced from a respective face plate front surface 26 and is sized and shaped to rest upon or stack on top of the front surface 26 of an adjacent or succeeding face plate 20–23 when in the nested configuration, as seen in FIG. 4.

Furthermore, the front surface 26 is sized and shaped and the ring 29 is sized and shaped to space the front surface 26 of one face plate 20–23 away from a rear surface 32 so as to prevent rubbing there between in the nested configuration. In this way, the points 25, 25', 25" or pattern 27 are not damaged by wear on the opposite rear surface 32 during usage. Each of the face plates 20–23 have mating front and rear surfaces 26 and 43 that allow them to stack in any configuration and then nest inside the cavity 10. The inner diameter of the cavity 10 is sized to be just slightly larger than the outer diameter of the plates 20–23, so that the plates 20–23 slide easily in the cavity 10, but fit relatively snugly, so that during use they do not move about significantly in the cavity 10 and cause wear on one or both. The face plate 20–23 that is on the bottom of the stack is a bottom face plate 31 and rests opposite to the in-use face plate 30 that is on the top of the stack and is selected according to the subject meat.

When the face plates 20–23 are stored in the nested configuration within the cavity 10, the plates 20–23 rest against the bottom and wall surface 13. Upon engaging the bottom surface 13 of the cavity 10 with the rear surface 43 of the face plates 20–23, the open inner cavity 10 is closed by a cylindrical retainer ring 34 that mates with the head 3 on the face surface 8. The retainer ring 34 has an inner-threaded surface 35 with a helically-wound thread that is adapted to matingly engage a corresponding outer-threaded surface 36 of the head 3. The retainer ring 34 has ribs 37 located on the outside of the ring 34 to provide friction to a user so that the ring 34 can be rotated or screwed onto the head 3. The retainer ring 34 is rotated until a face plate receiving surface 41 of the retainer ring 34 engages and meets with and biases against the top of the circumferential ring 29 of the top face plate 30. The rear surface 43 of the retainer ring 34 engages and exerts downward pressure on each respective circumferential ring 29 of the face plates 20–23 with the rear surface 43 of the bottom face plate 31 being pressed against the cavity bottom surface 13, so as to secure the plates 20–23 in place in the head 3. The face plates 20–23 are also prevented from moving laterally by the cavity side wall surface 14.

The riser 44 of the retainer ring 34 is designed to allow the face plate meat engaging surface 26 to extend past the retainer ring 34 so that a respective surface 26 engages the meat as opposed to the head 3 or face 8.

It is foreseen that the retainer ring of the meat mallet may be equipped with O-rings or like seals to prevent juices and other foreign substances from entering the cavity 10. The O-rings could ideally be placed on the retainer ring 34 on the face plate receiving surface 41 and on the head 3 between the outer threaded surface 36 and a shoulder 42. Because the O-rings would prevent extraneous material from entering into and contaminating the cavity 10 or non used plates, clean up could be achieved by simply washing the exterior.

The handle 5 has an ergonomic grip 52 that is constructed out of a material that allows for heightened slip resistance for maximum gripability with a high friction coefficient.

It is foreseen that one or more of the face plates could be replaced by an expansion sleeve, for use at the time of sale to replace one or more of the plates, if the buyer needs fewer than four options. Further, the set of plates could be expanded to include additional surface structure to satisfy the needs of different preparers.

It is further foreseen that the various plates are not required to be round or have round face surfaces in accordance with the invention. For example, the plates and/or surfaces could be triangular, square or other geometric configurations held in a similarly shaped cavity by a threaded ring of the type shown or by other structure such as a clamp or slide on and lockable retention device.

Material of construction of the meat mallet 1 can be varied to meet the desires of the consumer and the likely work load of the device. For example, the mallet 1 can be constructed of metal, such as aluminum, plastic, combinations of parts of metal and plastic or other suitable materials.

It is to be understood that while certain forms of the present invention have been illustrated and described herein, it is not to be limited to the specific forms or arrangement of parts described and shown.

What is claimed and desired to be secured by Letters Patent is:

1. A meat mallet for use in tenderizing meats comprising:
    (a) an elongate handle;
    (b) a head having a cavity with the cavity having an opening onto a face end opposite to a back end; the head being joined to the handle;
    (c) a plurality of face plates each having a different meat engaging surface thereon; the face plates being interchangeably stacked in a nested configuration and being sized and shaped to be received within the cavity with a top most face plate being an in-use face plate that partially extends outside of the cavity; and
    (d) a retainer operably securable to the head and retaining the face plates within the cavity while allowing the top most face plate to extend to the exterior of the head.

2. The meat mallet as set forth in claim 1 wherein:
    (a) the retainer is a ring having an inner-threaded surface that attaches to and mates with an outer-threaded surface located on one end of the head.

3. The meat mallet as set forth in claim 1 wherein:
    (a) the retainer is a ring having an outer-ribbed surface for ease of manipulation and gripability for locking engagement onto the head.

4. The meat mallet as set forth in claim 1 wherein:
    (a) said face plates have a circular periphery; and
    (b) the cavity is formed in a generally cylindrical configuration for storing the face plates.

5. The meat mallet as set forth in claim 1 wherein:
    (a) the face plates has front, rear and side surfaces with the side surface of each face plate being in a generally cylindrical configuration.

6. The meat mallet as set forth in claim 5 wherein:
    (a) at least one of the face plates has a front surface that has a plurality of outwardly projecting points.

7. The meat mallet as set forth in claim 6 wherein:
    (a) a first and second of said face plates each have front surfaces having points of varying sizes and shapes respectively to form a pattern.

8. The meat mallet as set forth in claim 6 wherein:
    (a) at least one of said face plates has a flattening surface thereon; said flattening surface being grooved so as to produce a cross hatched pattern on the front thereof.

9. The meat mallet as set forth in claim 5 wherein:
    (a) the rear surface has an indicia marked thereupon to permit a user to determine and select the top-most face plate from the plurality of face plates depending on use.

10. The meat mallet as set forth in claim 5 wherein:
    (a) each of the face plates has a circumferential rearwardly projecting ring with the respective side surface thereon; each of the rings has a rear surface spaced from a respective face plate front surface that is sized and shaped to rest upon the front surface of a succeeding face plate when in the nested configuration to facilitate stacking.

11. The meat mallet as set forth in claim 9 wherein:
    (a) the ring is sized in height sufficient to space the front tenderizing surface of one face plate away from an adjacent face plate so as to prevent rubbing therebetween when in the nested configuration.

12. The meat mallet as set forth in claim 1 wherein:
    (a) said head has a solid portion that is a weighted and rearwardly located behind the cavity, the solid portion being fabricated of a dense material.

13. In a mallet for tenderizing meat having a handle and a head; the improvement comprising:
    (a) a set of interchangeable plates with a different tenderizing surface on each of the plates; the plates being inserted with one another in a nested configuration and being selectively securable to a front of the head.

14. The mallet according to claim 13 wherein:
    (a) the plates are circular from side to side and the head includes a cylindrical bore that receives the plates in the nested configuration.

15. The mallet according to claim 14 including:
    (a) a retainer ring that is threadably mounted on said head at a front of the bore so as to retain the plates in the bore during use.

16. In a mallet for tenderizing meat having a handle and a head; the improvement comprising:
    (a) a set of interchangeable plates with a different tenderizing surface on each of the plates; the plates being selectively securable to a front of the head;
    (b) each of the plates includes a rearwardly projecting and circumferentially positioned support ring; and
    (c) each of the plates include a shoulder surrounding the tenderizing surface and being sized and shaped to receive a rear of a support ring of an adjacent plate in a nesting configuration.

* * * * *